(12) United States Patent
Ting

(10) Patent No.: US 9,201,814 B2
(45) Date of Patent: Dec. 1, 2015

(54) ELECTRONIC DEVICES AND METHODS FOR SHARING PERIPHERAL DEVICES IN DUAL OPERATING SYSTEMS

(71) Applicant: Wistron Corp., New Taipei (TW)

(72) Inventor: Tung-Sheng Ting, New Taipei (TW)

(73) Assignee: Wistron Corp., New Taipei (TW)

( * ) Notice: Subject to any disclaimer, the term of this patent is extended or adjusted under 35 U.S.C. 154(b) by 47 days.

(21) Appl. No.: 13/731,889

(22) Filed: Dec. 31, 2012

(65) Prior Publication Data

US 2013/0227175 A1    Aug. 29, 2013

Related U.S. Application Data

(60) Provisional application No. 61/602,569, filed on Feb. 23, 2012.

(30) Foreign Application Priority Data

Sep. 24, 2012   (TW) .............................. 101134871 A

(51) Int. Cl.
   *G06F 3/00*       (2006.01)
   *G06F 13/10*      (2006.01)
   *G06F 13/00*      (2006.01)

(52) U.S. Cl.
   CPC ...................................... *G06F 13/10* (2013.01)
   USPC .................................. 710/8; 714/11; 719/319

(58) Field of Classification Search
   CPC ........ G06F 3/00; G06F 13/00; G06F 2003/00
   USPC ...................... 710/8, 36, 14; 714/11; 719/319
   See application file for complete search history.

(56) References Cited

U.S. PATENT DOCUMENTS

| | | | | |
|---|---|---|---|---|
| 5,841,963 | A * | 11/1998 | Nakamikawa et al. | 714/11 |
| 7,421,735 | B2 | 9/2008 | Kerstens et al. | |
| 7,502,674 | B2 * | 3/2009 | Okude et al. | 701/36 |
| 7,529,861 | B2 * | 5/2009 | Ohta et al. | 710/8 |
| 7,581,223 | B2 * | 8/2009 | Harjula | 718/104 |
| 7,685,598 | B1 | 3/2010 | Badenell et al. | |
| 8,549,326 | B2 | 10/2013 | Mohamed | |
| 8,595,511 | B2 | 11/2013 | Aratsu et al. | |

(Continued)

FOREIGN PATENT DOCUMENTS

| | | |
|---|---|---|
| TW | 200712875 A | 4/2007 |
| TW | 200841710 A | 10/2008 |
| TW | 201025138 A | 7/2010 |

OTHER PUBLICATIONS

Taiwan Patent Office, Office Action, Patent Application Serial No. 101134871, Jun. 25, 2014, Taiwan.

(Continued)

*Primary Examiner* — Christopher Shin

(57) ABSTRACT

A method for sharing peripheral devices in dual operating systems for an electronic device having at least one peripheral device is provided. The method includes: receiving a setting value for the peripheral device under the first operating system from a user; activating a second operating system; transmitting the setting value to the second operating system; and switching from the first operating system to the second operating system, wherein the second operating system sets the peripheral device with the setting value and enables the electronic device to operate under the second operating system.

17 Claims, 2 Drawing Sheets

(56) References Cited

U.S. PATENT DOCUMENTS

| | | |
|---|---|---|
| 8,645,715 B2 | 2/2014 | Dawson et al. |
| 8,832,799 B2 * | 9/2014 | Matsimanis et al. ............... 726/4 |
| 2003/0036843 A1 * | 2/2003 | Okude et al. .................. 701/200 |
| 2004/0216144 A1 * | 10/2004 | Mitsui ........................... 719/321 |
| 2005/0028172 A1 * | 2/2005 | Yoshikawa et al. ........... 719/321 |
| 2007/0162901 A1 * | 7/2007 | Oh ................................. 717/148 |
| 2007/0198996 A1 * | 8/2007 | Chiu et al. .................... 719/321 |
| 2008/0177905 A1 * | 7/2008 | Ohta et al. ...................... 710/14 |
| 2009/0058887 A1 | 3/2009 | Lin |
| 2009/0059965 A1 | 3/2009 | Lin et al. |
| 2009/0061838 A1 | 3/2009 | Lin |
| 2009/0064186 A1 * | 3/2009 | Lin ................................ 719/315 |
| 2009/0064195 A1 | 3/2009 | Chin et al. |
| 2009/0113458 A1 | 4/2009 | Finger et al. |
| 2010/0125679 A1 * | 5/2010 | Tang et al. ......................... 710/8 |
| 2010/0172499 A1 | 7/2010 | Sugiyama |
| 2011/0154082 A1 * | 6/2011 | Parks et al. .................... 713/323 |
| 2012/0005691 A1 * | 1/2012 | Wong et al. ................... 719/319 |
| 2012/0243018 A1 * | 9/2012 | Shirota et al. ................ 358/1.13 |
| 2013/0262862 A1 | 10/2013 | Hartley |
| 2014/0122749 A1 * | 5/2014 | Ting ................................ 710/14 |

OTHER PUBLICATIONS

Taiwan Patent Office, Office Action, Patent Application Serial No. 101134872, Jul. 17, 2014, Taiwan.

US Patent Office, Office Action, U.S. Appl. No. 13/731,904, Jan. 13, 2015, US.

* cited by examiner

ELECTRONIC DEVICES AND METHODS FOR SHARING PERIPHERAL DEVICES IN DUAL OPERATING SYSTEMS

CROSS REFERENCE TO RELATED APPILCATIONS

The application claims the benefit of U.S. Provisional Application 61/602,569, filed on Feb. 23, 2012 and claims priority under 35 U.S.C. §119(a) on Patent Application No(s). 101134871, filed in Taiwan, Republic of China on Sept. 24, 2012, the entire contents of which are hereby incorporated by reference.

BACKGROUND OF THE INVENTION

1. Field of the Invention

The present invention relates to dual operating system architectures, and in particular, relates to techniques for sharing peripheral devices in dual operating systems.

2. Description of the Related Art

Portable electronic devices, such as notebook computers and smartphones, have become indispensable for modern day humans.

Conventionally, the operating system of the electronic devices which is mostly used is the Microsoft Windows operating system (OS). Nowadays, however, the Android OS, which is based on a Linux operating system, is also popularly used. The two operating systems perform differently with different operations. In order to take advantage of both of the operating systems, some designs integrate the two operating systems into a single one electronic device. In some designs, the electronic device has only one CPU that processes instructions for dual operating systems, while in some other designs, separate CPUs are respectively in charge of one of the operating systems Generally, in a dual operating system architecture, only one of the operating systems will be in operation while the other will stay in a sleep state at the same time. In the manner, the dual operating systems can share resources with each other and unnecessary conflicts may be prevented.

However, when switching between the operating systems, the peripheral devices are unable to maintain a consistent setting since one operating system does not know the system settings of the other operating system. For example, the display brightness and the speaker volume may suddenly change when switching between the operating systems. Thus, users must frequently adjust system settings, which is inconvenient for users.

BRIEF SUMMARY OF THE INVENTION

The present invention provides a method for sharing peripheral devices in dual operating systems for an electronic device having at least one peripheral device, comprising: receiving a setting value for the peripheral device under the first operating system from a user; activating a second operating system; transmitting the setting value to the second operating system; switching from the first operating system to the second operating system, wherein the second operating system sets the peripheral device with the setting value and enables the electronic device to operate under the second operating system.

The present invention further provides an electronic device, installed with a first operating system and a second operating system, and having at least one peripheral device, comprising: a first synchronization manager, operating under the first operating system, transmitting a setting value of the peripheral device to the second operating system when activating the second operating system under the first operating system; a second synchronization manager, operating under the second operating system, receiving and storing the setting value from the first synchronization manager; and a controller, coupled to the first synchronization manager, the second synchronization manager and the at least one peripheral device, setting the peripheral device according to the setting value stored in the second operating system after the first operating system has been switched to the second operating system.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. The description is made for the purpose of illustrating the general principles of the invention and should not be taken in a limiting sense. The scope of the invention is best determined by reference to the appended claims.

To prevent dual input of system settings of peripheral devices required in the prior art, the present invention provides a new dual operating system architecture, and a method for sharing peripheral devices for the dual operating systems.

Dual Operating System Architecture

Figure 1:
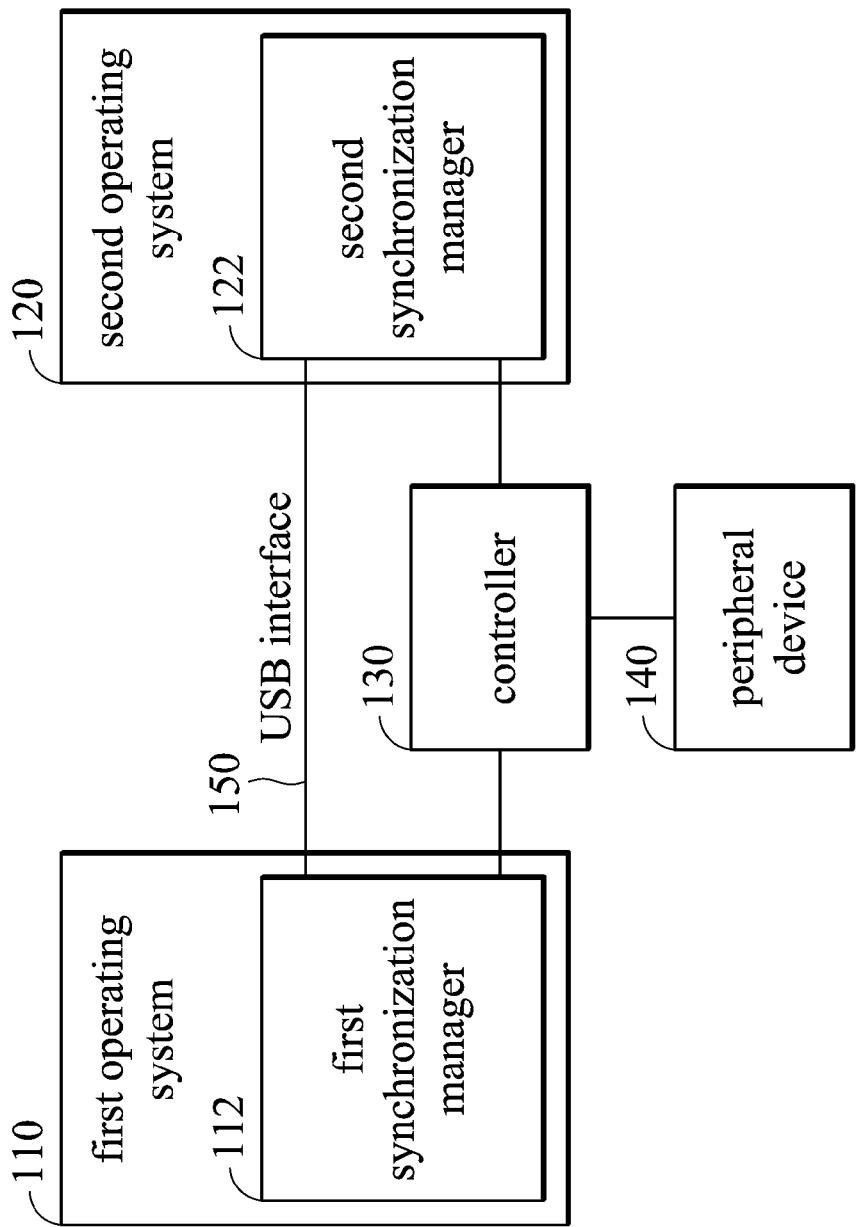
FIG. 1 is a schematic diagram of an electronic device which operates dual operating systems according to an embodiment of the present invention.

FIG. 1 is a schematic diagram of an electronic device which operates dual operating systems according to an embodiment of the present invention. The electronic device 100 of the present invention can be a notebook computer or a smart phone, which comprises: a first operating system 110, a second operating system 120, a controller 130 and a peripheral device 140. For example, the first operating system 110 can be a Windows operating system, and the second operating system 120 can be an Android operating system. However, the present invention is not limited to the example, and can be applied to various operating systems. The controller 130 of the present invention, for example, is an independent embedded (EC), which is coupled to the two operating systems 110 and 120 and the peripheral device 140, and can be used to control the peripheral device 140 according to commands issued from the two operating systems 110 and 120. The peripheral device 140 of the present invention comprises various input/output devices such as keyboards, mice, touchpads, trackballs, trackpoints, displays, speakers, headsets, and cameras, etc. (not shown in FIG. 1). The peripheral device 140 can be used to perform various specific functions. It should be noted that the two operating systems 110 and 120 can share the peripheral device 140 via the independent controller 130.

In a preferred embodiment, there is first synchronization manager 112 running under a the first operating system 110, and a second synchronization manager 122 running under the second operating system 120. The synchronization managers 112 and 122 can be used to coordinate the switching and data synchronization between the operating systems 110 and 120. In the embodiment, the synchronization managers 112 and 122 are not only coupled to the controller 130, but also coupled to each other via a transmission interface 150. For example, The transmission interface 150 is a universal serial bus (USB) interface. With the USB interface 150, the operating systems 110 and 120 can exchange information more directly, and the probability of conflict between the two operating systems can thus be reduced. The USB interface is merely for illustration, and the present invention should not be limited thereto.

The electronic device 110 with the dual operating system architecture described above can be used to perform the method of the present invention to share a peripheral device in a dual operating systems. Each step of the method of the present invention will be described in accordance with FIGS. 1-2 in the following.

Method for Sharing Peripheral Devices In a Dual Operating System

Figure 2:
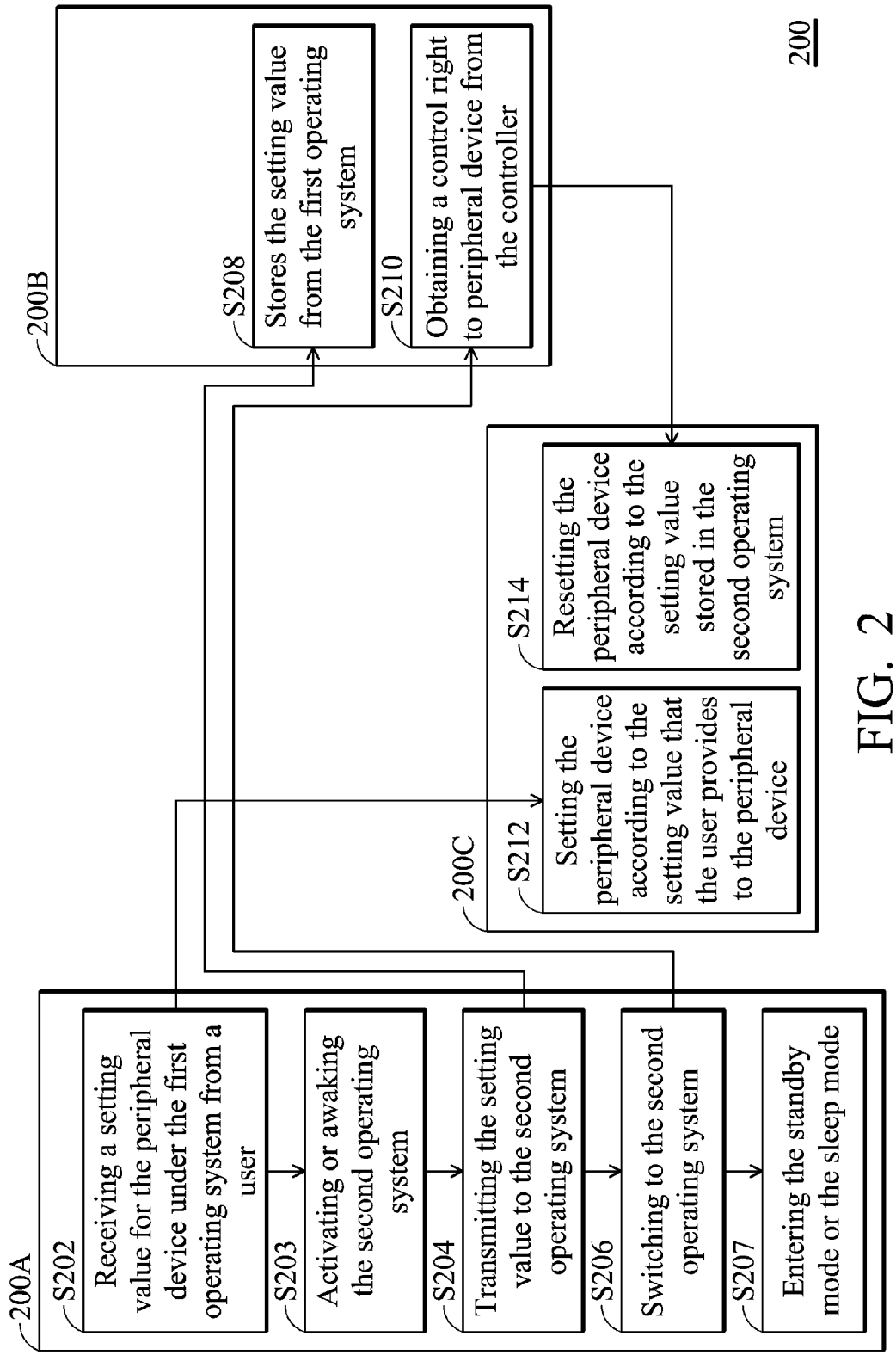
FIG. 2 is a flow chart of the method for sharing peripheral devices in a dual operating system according to an embodiment of the present invention.

FIG. 2 is a flow chart of the method for sharing peripheral devices in a dual operating system according to an embodiment of the present invention. Please refer to FIGS. 1 and 2. The method 200 of the present invention can be performed in the electronic device 100 described above, and comprises and can be divided into three processes: process 200A, which is performed by the first synchronization manager 112 under the first operating system 110; process 200B, which is performed by the second synchronization manager 122 under the second operating system 120; and process 200C, which is performed by the controller 130. For illustration, the processes 200A, 200B and 200C are respectively shown in different blocks in FIG. 2. Note that although the following embodiments merely describe the process where the first operating system is switched to the second operating system, the process where the second operating system is switched to the first operating system can be performed in the same manner and thus will not be further discussed.

The process 200A of the first operating system 110 comprises: in step S202, receiving a setting value for the peripheral device 140 under the first operating system 110 from a user. For example, the setting value of the peripheral device can be a brightness value of a display, volume value of a speaker, sensitivity and correction value of a touchpad, or login setting value (user's account and password) of a network equipment such as a wireless access point (AP). Then, in step S203, when the first operating system 110 receives the command from the user to switch operating systems (for example, when the user presses designated keys on the keyboard or clicks a designated object on a display interface), the controller 130 activates (awakes) the second operating system 120. Then, in step S204, the first operating system 110 transmits the setting value to the second operating system 120 through the transmission interface 150. In step S206, the first operating system 110 is switched to the second operating system 120. Finally, in step S207, the first operating system 110 enters the standby mode or the sleep mode. Note that step S204 (i.e., transmitting the setting value) has to be performed before step S206 (i.e., switching between the operating systems) to make sure that the second operating system 120 has known how the user changed the setting of the peripheral device 140 before the first operating system 110 enters the standby mode or a sleep mode.

The process 200B of the second operating system 120 comprises step S208 and steps S210, where step S208 is subsequently performed after step S204 of the process 200A, and step S210 is subsequently performed after step S206 of the process 200A. In step S208, the second operating system 120 stores the setting value after receiving the setting value issued from the first operating system 110. In an embodiment, the setting value can be stored as a setting value file when, for example, the peripheral device is a touchpad, trackpoints or the like. In step S210, the second operating system 120 obtains a control right to peripheral device 140 from the controller 130 (for example, due to a notification message from the first operating system 110), and completes the switching between the operating systems.

The controller 130 can perform the process 200C including step S212 or step S214. The controller 130 in step S212 operates under the first operating system 110, while in step S214 operates under the second operating system 120. Step S212 is performed subsequently after step S202. Meanwhile, the controller 130, which is still under the control of the first operating system 110, adjusts the setting value of the peripheral device 140 according to the setting value that the user provides to the peripheral device 140. Step S214 is subsequently performed after step S210. Meanwhile, the control right of the controller 130 is transferred from the first operating system 110 to the second operating system 120, and the controller 130 sets the peripheral device according to the setting value 140 or setting value file stored in the second operating system 120 in step S208. In other words, the setting value can be kept the same as originally stored in the first operating system 110, and synchronization of the setting values can thus be achieved.

With the present invention, the display brightness, speaker volume, and other system settings of the peripheral device will not be changed due to the switching of the operating systems, and a consistent operating environment will help to improve user experience for the dual operating system architecture.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for sharing peripheral devices in dual operating systems for an electronic device having at least one peripheral device, a first operating system, and a second operating system, comprising:
    before activating the second operating system, receiving a setting value of the peripheral device set by a user under the first operating system;
    activating the second operating system;
    transmitting the setting value to the second operating system;
    after transmitting the setting value to the second operating system, switching from the first operating system to the second operating system, wherein the first operating system is entered into a standby mode or a sleep mode;
    storing the setting value;
    setting the peripheral device with the setting value by the second operating system; and
    operating the electronic device under the second operating system.

2. The method for sharing peripheral devices in dual operating systems as claimed in claim 1, wherein the second operating system stores the setting value as a setting value file.

3. The method for sharing peripheral devices in dual operating systems as claimed in claim 1, wherein the first operating system directly transmits a notification message to the second operating system via a transmission interface to switch to the second operating system.

4. The method for sharing peripheral devices in dual operating systems as claimed in claim 1, wherein the setting value is transmitted from the first operating system to the second operating system via a transmission interface.

5. The method for sharing peripheral devices in dual operating systems as claimed in claim 1, wherein the setting value of the peripheral device is a brightness value of a display.

6. The method for sharing peripheral devices in dual operating systems as claimed in claim 1, wherein, the setting value of the peripheral device is a volume value of a speaker.

7. The method for sharing peripheral devices in dual operating systems as claimed in claim 1, wherein the setting value of the peripheral device is a login setting value of a network equipment.

8. The method for sharing peripheral devices in dual operating systems as claimed in claim 2, wherein the setting value file of the peripheral device is a file that records the setting value of a touchpad or a trackpoint.

9. An electronic device, installed with a first operating system and a second operating system, and having at least one peripheral device, comprising:
 a first synchronization manager, operating under the first operating system, configured to transmit a setting value of the peripheral device set by a user to the second operating system when activating the second operating system under the first operating system;
 a second synchronization manager, operating under the second operating system, configured to receive and store the setting value from the first synchronization manager; and
 a controller, coupled to the first synchronization manager, the second synchronization manager and the at least one peripheral device, configured to activate the second operating system under the first operating system, set the peripheral device according to the setting value stored in the second operating system, and enter the first operating system into a standby mode or sleep mode so as to switch the electronic device to the second operating system.

10. The electronic device as claimed in claim 9, wherein the second synchronization manager is configured to store the setting value as a setting value file.

11. The electronic device as claimed in claim 9, wherein the first synchronization manager is configured to directly transmit a notification message to the second synchronization manager via a transmission interface to switch to the second operating system.

12. The electronic device as claimed in claim 9, wherein the first synchronization manager is configured to transmit the setting value to the second synchronization manager via a transmission interface.

13. The electronic device as claimed in claim 12, wherein, the transmission interface is a universal serial bus (USB) interface.

14. The electronic device as claimed in claim 9, wherein, the setting value of the peripheral device is a brightness value of a display.

15. The electronic device as claimed in claim 9, wherein, the setting value of the peripheral device is a volume value of a speaker.

16. The electronic device as claimed in claim 9, wherein, the setting value of the peripheral device is a login setting value of a network equipment.

17. The electronic device as claimed in claim 10, wherein the setting value file of the peripheral device is a file that records the setting value of a touchpad or a trackpoint.

* * * * *